United States Patent [19]

Nannen

[11] 4,090,808
[45] May 23, 1978

[54] TAPPING DEVICE

[76] Inventor: William G. Nannen, 110 W. Main St., Smethport, Pa. 16749

[21] Appl. No.: 714,679

[22] Filed: Aug. 16, 1976

[51] Int. Cl.² .................................................. B23D 77/14
[52] U.S. Cl. ........................................ 408/222; 10/1 B; 10/141 R; 408/79
[58] Field of Search ............... 10/1 B, 140, 141 R, 10/142, 145; 408/72, 79, 156, 158, 159, 169, 215, 219, 220, 224, 222, 188

[56] References Cited

U.S. PATENT DOCUMENTS

| 128,379 | 6/1872 | Faburn | 408/158 |
| 2,379,908 | 7/1945 | Johnson | 408/219 |
| 3,829,921 | 8/1974 | Delaney | 10/141 R |

FOREIGN PATENT DOCUMENTS 1,217,317  12/1970  United Kingdom ............... 408/224

Primary Examiner—Othell M. Simpson
Assistant Examiner—W. D. Bray
Attorney, Agent, or Firm—Lane, Aitken, Dunner & Ziems

[57] ABSTRACT

A tapping device having at least two components for use in rethreading damaged threads in a tapped opening or for tapping an opening in a workpiece, wherein the thread cutting member is inserted into the opening and its cutting surface is held in place and is pressed against the work surface by one or more guide members that have also been inserted into the opening and wedged tightly adjacent the cutting member. The cutting member and the guide member are then rotated as a unit and threads are tapped or retapped in the work surface.

7 Claims, 3 Drawing Figures

TAPPING DEVICE

BACKGROUND OF THE INVENTION

This invention relates to a two piece tapping or rethreading device and, more particularly, to such a device including at least a thread cutting member and a guide member which are inserted into the opening to be threaded and which cooperate with one another to cut threads in a work surface of the opening. The guide member presses against the cutting member during the cutting operation and thereby maintains the cutting means in proper alignment with the work surface and holds the cutting surfaces of the cutting member against the work surface.

Hand taps are a convenient means known to the art to cut internal threads in drilled holes. Conventional hand taps are comparatively short and have a thread cutting section and a shank of approximately the same length. The shank usually has a square end that accommodates a tap wrench or other turning device. The cutting area of a tap usually includes a plurality of flutes, with the cutting edges of the tap being on the raised sections that are on either side of a particular flute.

There are a number of different types of machine driven taps that have either a means of expanding or collapsing the cutting surface or tap chasers of a particular tap. Some adjustable taps of the expanding variety are made of a solid piece of metal which is split and provided with means for expanding the cutting surfaces to compensate for wear, while other types of adjustable taps have inserted blades or chasers which are rigidly held but are capable of radial adjustment.

Collapsing taps are used to collapse the tap chasers or cutting means of a tap in order to permit the rapid removal of the tap from a hole.

In each of the above types of taps, it is difficult to rethread damaged threads in a tapped opening because of the difficulty in aligning the good threads in the opening with the cutting edges of the tap. If the good threads are not properly aligned, the entire opening will be unnecessarily rethreaded and perhaps misthreaded.

Accordingly, it is an object of this invention to provide a simple and convenient means to align the good threads in a tapped opening with the thread cutting edges of the tap so that the tap may rethread only the damaged threads in the opening.

A further object of this invention is to provide means whereby a tapped opening may be rethreaded or a drilled opening may be initially tapped by the action of two separate tapping pieces cooperating with one another to tap or rethread the opening.

These and other objects of this invention will become apparent from a review of the detailed specification which follows and a consideration of the accompanying drawings.

BRIEF SUMMARY OF THE INVENTION

In order to achieve the objects of the invention and to overcome the problems of the prior art, the two piece tap, according to the present invention, includes means for cutting threads in an opening by the action of a cutting member in contact with a guide member, both members being insertable adjacent one another into the opening.

If the tap is used as a rethreader, the cutting member is first placed in the tapped opening so that the cutting edges of the tap are aligned with the corresponding undamaged threads in the opening. The guide member is then inserted into the opening and pressed downwardly until its mating surface comes in contact with and presses against the corresponding mating surface of the cutting member.

Since the guide member is wedged tightly against the cutting member, the two members can rotate as a single unit upon rotation of the cutting member. Thus, when the end of the shank of the cutting member is gripped and a turning force is applied, the rotational motion is transferred to both the guide member and the cutting member and they rotate in the opening as a unit. It should be noted that the shank can be attached to either the guide member or the cutting member without altering the operation of the invention.

The pressure of the guide member against the cutting member in conjunction with the rotational motion causes the cutting member to cut new threads in the inner walls of the opening in place of the damaged threads. The undamaged thread in the opening is not affected by the cutting action because the cutting edges are aligned with the good threads and, hence, have no material to cut.

The cutting member and the guide member operate in a similar fashion if the opening is initially untapped, since threads are still cut in the inner walls of the opening upon contact with the cutting edges of the cutting means, particularly if the leading portion of the cutting edge is slightly chamfered. However, in this situation, the tapping device may include starter threads in the opening in order to allow the cutting edges of the tapping device to initially engage in proper alignment inside the opening.

DETAILED DESCRIPTION OF THE PREFERRED EMBODIMENTS

Figure 1:
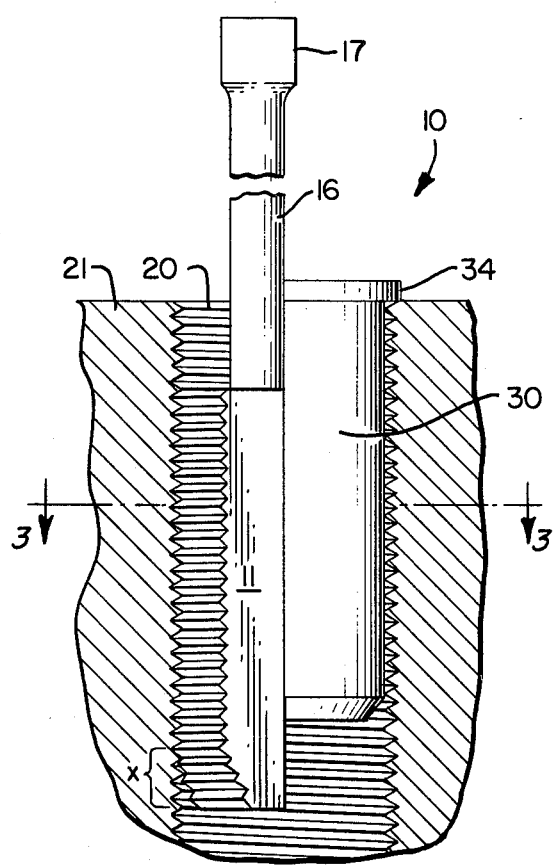
FIG. 1 shows a side cross-sectional view of the preferred embodiment of the two piece tapping device according to the invention.

The preferred embodiment of the present invention designated by reference numeral 10, is illustrated in FIG. 1. The cutting member 11 includes a shank 16 having a gripping surface 17, preferably comprising a plurality of planar surfaces at the end thereof, and a thread cutting area that axially extends from the opposite end of the cutting member 11 to the beginning of the shank portion 16.

Figure 2:
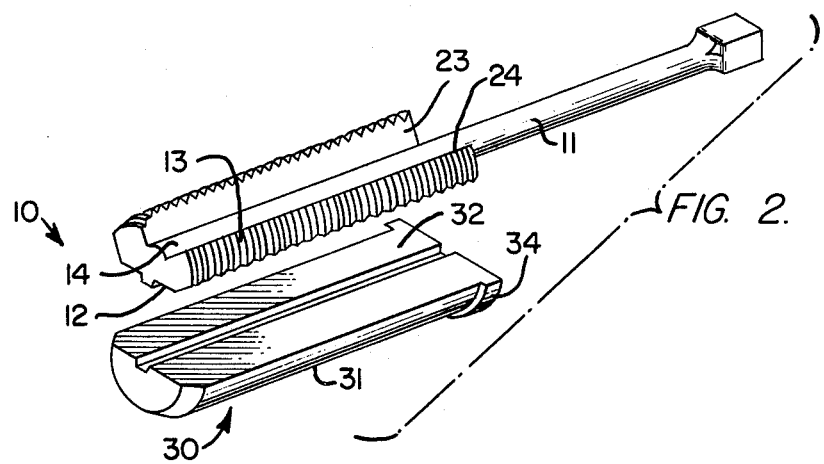
FIG. 2 shows an isometric view of the components of the device.

As shown in FIG. 2, the cutting area comprises a single flute or groove 14 that separates two raised cutting surfaces 13, each of the raised cutting surfaces 13 having a plurality of threads arranged axially along their periphery. The angular width between the raised cutting surfaces 13 is defined by a pair of surfaces 23 and 24 which extend radially and axially. For smaller diameter member 11, a single cutting surface 13 could be used. However, for larger diameter members, more than two cutting surfaces could be used.

The outer periphery of each thread on the cutting surfaces 13 of the cutting member 11 has an arc-shaped cutting edge that is used to cut threads 20 in workpiece 21 as shown in FIG. 1.

Since the difference between the basic thread major diameter and the basic thread minor diameter defines the height of any thread, it is clear that in cutting the thread 20 in the workpiece 21 the outer periphery or major diameter of the thread produced at 20 is defined by the major diameter of the tap thread and, likewise, the minor diameter of the tap thread forms or defines the minor diameter of the workpiece thread 20.

The cutting member 11 is not necessarily symmetrical in cross section as are most taps since its plurality of cutting surfaces 13 are arranged in the area of an arc of less than 180° about the axis of rotation of the cutting member 11 and the opposing side of the cutting member 11 is defined by a planar surface 12 extending axially along the length of the cutting member 11. The surface 12 may be slightly tapered to compensate for small variations in opening size.

In use, the cutting member 11 is placed in the opening to be tapped or rethreaded so that the cutting surfaces 13 touch the wall of the opening if the opening is untapped or engaged with the good threads in the opening if it has been previously tapped. As shown in FIG. 1, the guide member 30 is then inserted into the opening and is pushed downwardly until its mating surface 32 comes in contact with and presses against the mating surface 12 of the cutting member 11. A lip 34 at or near the end of the guide member 30 prevents the guide member 30 from being wholly inserted into the opening in the workpiece 21 to permit easy removal of the guide member from the opening.

While the surface 12 is shown as including an axial projection for mating in register with a corresponding groove in the surface 32, the respective mating surfaces could also be planar or of any other convenient mating shape.

Figure 3:
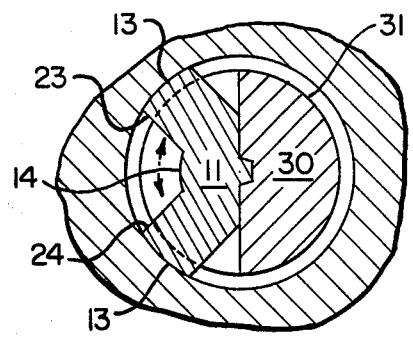
FIG. 3 shows a cross-sectional view of the device taken along line 3—3 of FIG. 1.

The outer circumferential surface 31 of the guide member 30 as shown in FIG. 3 is approxiately equal to the minor diameter of the threaded opening so that the guide member 30 can be inserted into the opening of the workpiece. In addition, the mating surface 32 is slightly tapered to make up for small variations in hole size, and the lower end of the guide member 30 is chamfered to allow easy insertion into the opening.

Following the insertion of the guide member 30, a gripping tool is applied to the gripping surface 17 of the shank 16 and a rotational force is applied. Due to the lateral pressing force of the guide member 30 on the cutting member 11, the guide member 30 and the cutting member 11 rotate as a unit. The cutting edges of the cutting member consequently cut threads in the workpiece 21.

Although the cutting member 11 is preferably made from a metal that is strong enough to withstand the stresses of tapping or rethreading and the dimensions of the cutting member 11 and the guide member 30 should be such as to allow an easy rotary motion with a resultant precise cutting of threads, the exact dimensions and materials of the present invention are to be determined by conventional engineering practices with due allowance made for types of materials, thread form, and the like.

It should be noted that if the apparatus according to the invention is used to thread an untapped opening, the opening may have starter threads to allow the cutting surfaces 13 of the cutting member 11 to engage initially in proper alignment with the hole. As shown in FIG. 1 and FIG. 2, the leading portion of the threaded surface 13 may be chamfered for conveniently starting the threading in an untapped opening. In such a case, it may be more convenient to insert the guide member 30 in the opening first, followed by insertion of the member 11 adjacent thereto, and proceeding as described.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A tapping device for use in rethreading damaged threads in a tapped opening or for tapping an opening wherein a cutting means is inserted into the opening and is adapted to cooperate with a guide member inserted into the opening adjacent to the cutting means to cut threads in a work surface of the opening, said tapping device comprising:

cutting means which include at least one thread cutting surface for cutting threads into said work surface;

a guide member slideably insertable into said opening between said cutting means and said work surface, said guide member having a surface contacting said cutting means and a surface contacting said work surface to maintain the cutting surfaces of said cutting means in operative alignment and contact with said work surface; and an axially extending arm structurally adapted to accommodate a turning means to cooperate with said cutting means and said guide member, to rotate said cutting means and said guide member when said turning means applies a rotational force to said arm.

2. The device as set forth in claim 1 wherein said cutting means includes a plurality of raised cutting surfaces separated by grooves or flutes, said cutting surfaces being located asymmetrically about the axis of rotation of the cutting means.

3. The device as set forth in claim 2 wherein said cutting means includes an axially extending surface that is structurally adapted to mate with a corresponding surface of said guide member.

4. The device as set forth in claim 1 wherein said guide member includes an axially extending surface that is structurally adapted to mate with a corresponding surface of said cutting means.

5. The device as set forth in claim 4 wherein said guide member includes an outer circumferential axially extending periphery that matches the circular contour of the opening to be threaded and that allows said guide member to be inserted into the opening in operative association with said cutting means.

6. The device as set forth in claim 5 wherein said guide member includes a lip that prevents complete insertion of said guide member into the opening and a chamfered insertion end of said guide member to allow easier insertion of said guide member into the opening.

7. The device as set forth in claim 1 wherein said axially extended arm is attached to said cutting means.

* * * * *